UNITED STATES PATENT OFFICE.

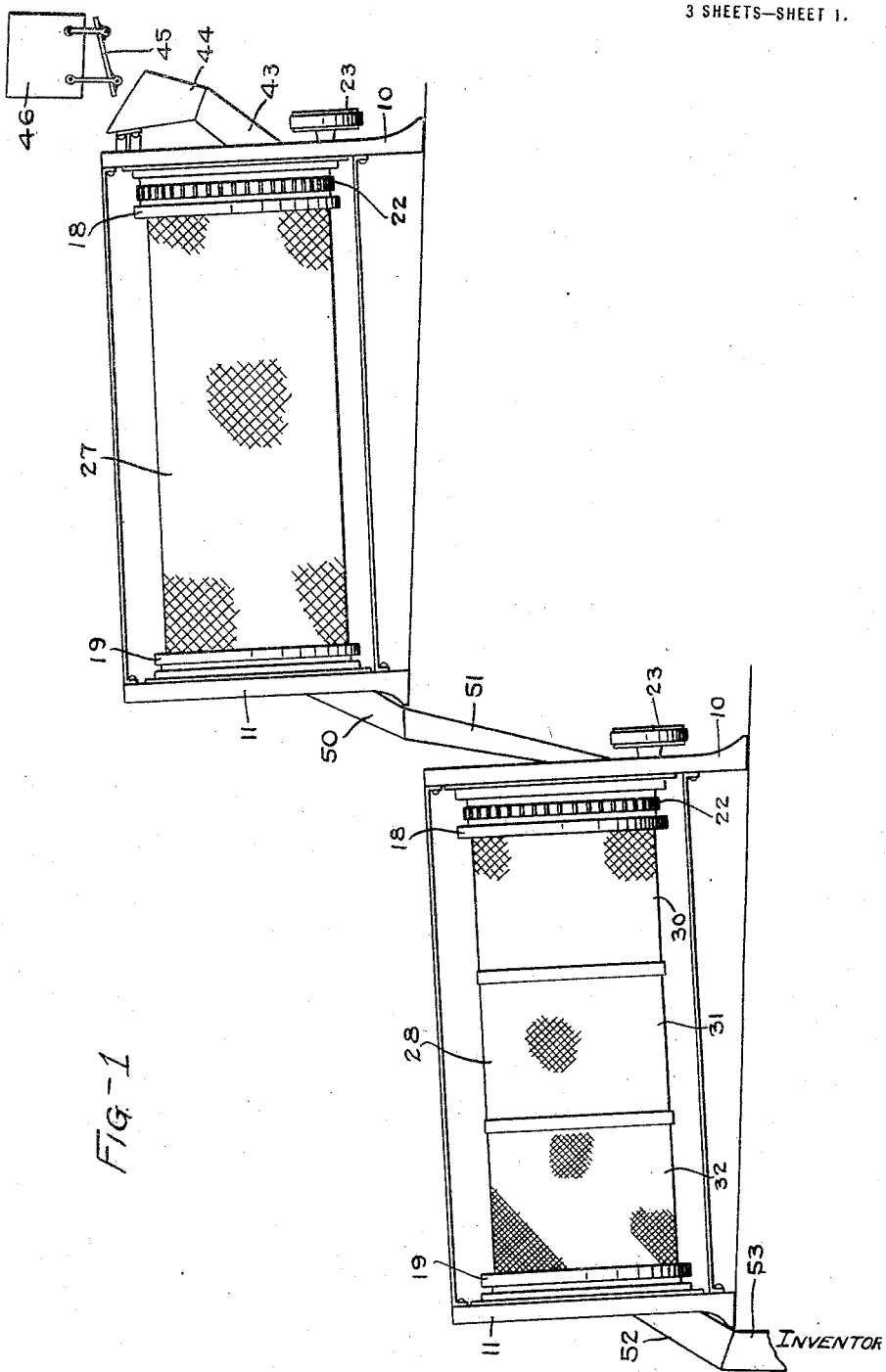

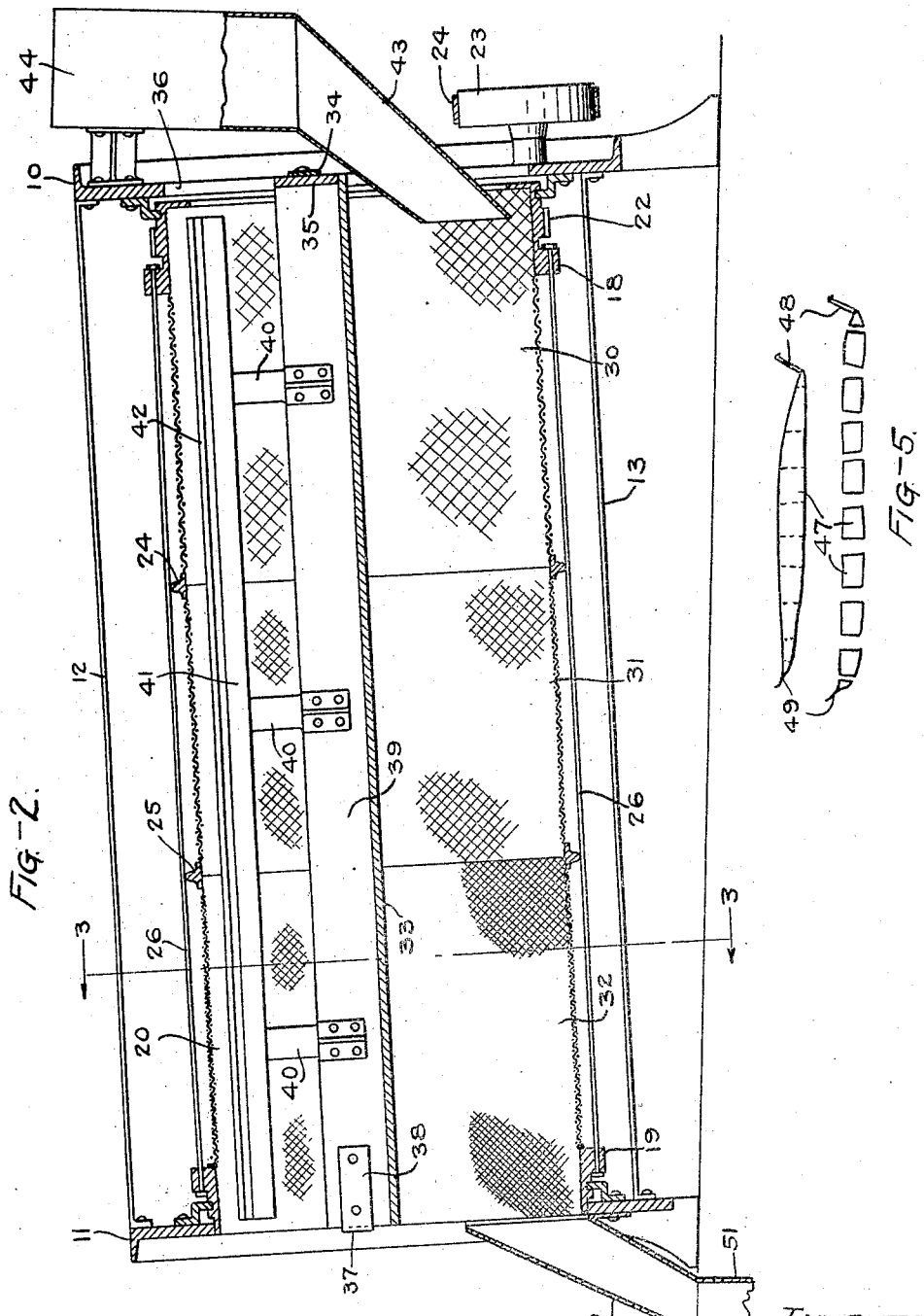

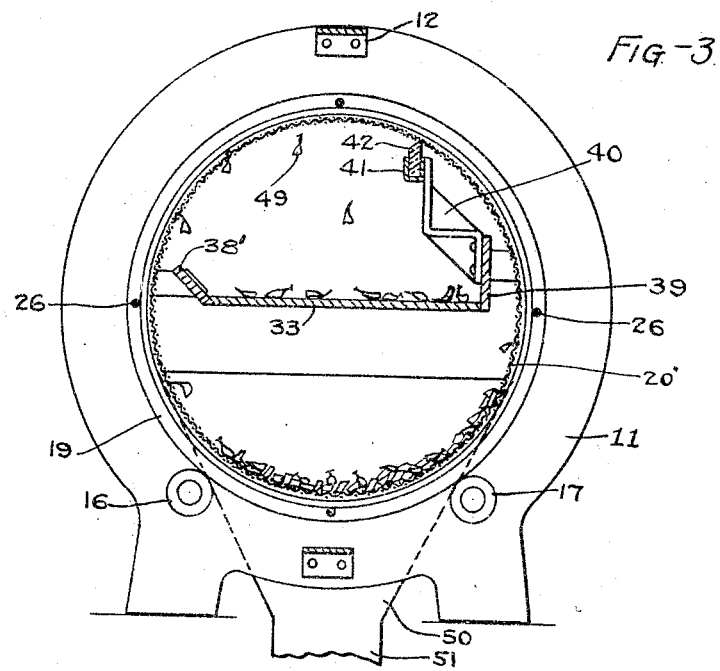
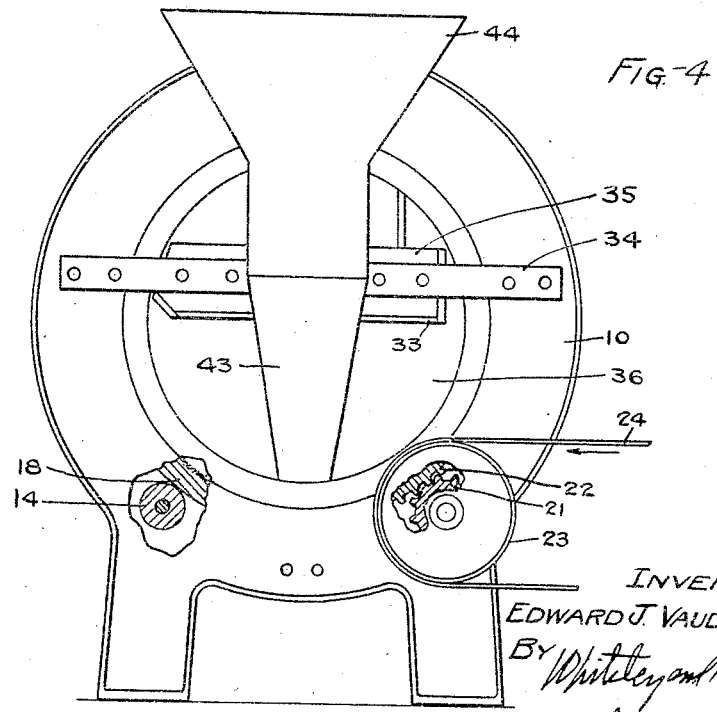

EDWARD J. VAUDREUIL, OF EAU CLAIRE, WISCONSIN.

APPARATUS FOR SEPARATING TIP ENDS OF BEAN-PODS.

1,364,222.  Specification of Letters Patent.  Patented Jan. 4, 1921.

Application filed May 19, 1920. Serial No. 382,535.

*To all whom it may concern:*

Be it known that I, EDWARD J. VAUDREUIL, a citizen of the United States, residing at Eau Claire, in the county of Eau Claire and State of Wisconsin, have invented certain new and useful Improvements in Apparatus for Separating Tip Ends of Bean-Pods, of which the following is a specification.

My invention relates to apparatus for separating tip ends of bean pods from a mass of bean pods and has for its object to provide a device whereby bean pods, commonly known as string beans, after having been cut up into a multiplicity of pieces, are acted upon progressively so that the tip ends of the cut up mass will be removed from the intermediate pieces, said tip ends being undesirable in the canned product which should include only the intermediate sections. This apparatus entirely eliminates the preliminary step of snipping the beans, that is, removing the tip ends of the beans by hand or otherwise, which has always been practised in canning beans, either canning the whole pods or sections thereof. The cost of the preliminary operation of snipping beans has always been very great because where done by hand the operation is laborious and slow and where done by machinery the machines are complicated and expensive and have relatively small capacity. It is the primary object of my invention to provide, in conjunction with a cutter of any standard form, means receiving the mass of cut beans cut up without preliminary snipping, and acting upon said mass repeatedly and continuously, said means embodying devices for engaging the pointed tips either from the blossom end, or the stem end, and lifting them from the mass and depositing them in a suitable receptacle. More specifically, my invention consists in the provision of one or more cylinders of perforate material rotating about a fixed trough held within the cylinders. The mass of cut beans is fed into the end of the cylinder, which, as it is rotated brings the perforate surface of the screen in contact with the cut mass of beans, rolling them and turning them. In this way the projection from the tip ends of the bean pods will pass through perforations and be caught thereby and be lifted out of the mass of beans, thus carried above the trough member into which the tip ends are ultimately deposited. The mass of cut up bean pods thus freed from the undesirable tip ends is then discharged from the machine.

The full objects and advantages of my invention will appear in connection with the detailed description thereof and the novel features thereof are particularly pointed out in the claims.

In the drawings, illustrating the application of my invention in one form,—

Figure 1 is a diagrammatic view showing the arrangement of parts in connection with the practice of my invention. Fig. 2 is a sectional longitudinal elevation. Fig. 3 is a view drawn on line 3—3 of Fig. 2. Fig. 4 is an end elevation of one of the cylinders, with some parts broken away. Fig. 5 shows the manner in which the bean pods are cut up.

As illustrated, a frame is provided comprising end members 10 and 11 secured in fixed relation by longitudinal members 12 and 13. Upon the frame members 10 and 11 are journaled rollers 14, 15, 16 and 17, which engage rings 18, 19 on a longitudinal drum 20 formed of perforate material. The drum 20 is thus held rotatably supported upon rollers 14, 15, 16, 17 and is preferably driven by a pinion 21 meshing with a gear 22 fast on ring 18 and operated by pulley 23 and belt 24 from any desired source of power. The cylinder or drum 20 embodies other rings 24, 25 between the rings 18, 19 and is provided with longitudinal rods 26 passing through rings 18, 19 and over rings 24, 25 by which the cylinder is secured longitudinally.

The walls of the cylinder, as in 27 of Fig. 1, may be formed of woven wire mesh of a single size throughout. As in 28 of Fig. 1 and as shown in Fig. 2, the walls of the drum 20 are formed of perforate sections of woven mesh 30, 31, 32, each of a smaller mesh than the preceding. That is, the mesh of perforate section 30 at the rear of the drum is larger than the mesh of intermediate section 31, which in turn has a mesh larger than the mesh of the front section 32. Although three of such sections are shown here, it is obvious a greater or less number of perforate sections having progressively decreasing mesh might be employed where desirable.

Within rotating cylinder 20 is a fixed trough 33 preferably positioned at or near the axial center of drum 20 and supported from the frame member 10 by a transverse bar 34 bolted to the end 35 of trough 33 and to a flange 36 of the frame member 10. Similarly a bar 37 is secured to the frame member 11 and to the end of the trough 33 by means of angle pieces 38 so as to leave trough 33 open at its forward end for the discharge of material collected thereon. In this manner the trough is held within the drum 20 so that the drum rotates about it, with the bottom of the trough preferably near the axial center of the drum. The trough 33 has a sloping slide 38′ adjacent that side of the drum which is rising when the drum is in motion, and the other side of the trough is provided with a longitudinal side wall 39 to which is attached a multiplicity of brackets 40 carrying at their upper end receptacles or grips 41 which hold a removable brush member 42 extending longitudinally within the drum and adapted to engage the inner wall of the drum so as to brush off any tip end pieces carried by the drum which have not become disentangled by gravity.

A spout 43 leads from a hopper 44 into the interior of drum 20. The hopper 44 receives the cut up pieces from the shaker 45 of a cutter 46 of any well known form and which cutter will separate the bean pods into intermediate pieces 47, stem end pieces 48 and blossom end pieces 49, as shown in Fig. 5. From the drum 20 (or, as shown in Fig. 1, 27) the cut pieces of bean are discharged into a hopper 50 which, by a chute 51, may discharge into a second drum, as 28, and which in turn discharges into a hopper 52 discharging into a chute 53 leading to the point of storage.

As best shown in Fig. 3, stem ends 48 and tip ends 49 will have the stem end or tip thereof pass through the openings in the mesh of the drum 20 which will seize said stem ends or blossom ends and carry them up with the drum above the trough 33, where, in most instances, they will fall off by gravity and accumulate. Those which do not discharge by gravity into trough 33 are brushed off by the brush member 42.

In practice it may be necessary to use but a single drum as 27, of the uniform mesh, or but one drum, of the type shown in Fig. 2, of a multiplicity of meshes of decreasing sizes, or, in some instances, better results may be obtained by using two drums, as shown in Fig. 1, which is the preferred form of practising my invention. It will be noticed that dust, seeds and very small particles of stems or other materials not suitable for canning will sift through the screen 27 or the larger screen section 42, accumulating under the drum. The accumulations in the trough 33 may readily be removed from time to time by a hoe or similar device, which is also true of accumulations under drum 27.

I claim:

1. In combination with a cutter adapted to cut up unsnipped bean pods into a mass of intermediate and tip end pieces, a rotating drum, means for feeding said mass of pieces into said drum, means carried by the drum for engaging said tip end pieces and separating them from the mass, means within the drum for receiving the tip end pieces as they are discharged from the drum.

2. A machine for separating tip end pieces from a mass of cut bean pods which have not previously been snipped, comprising a drum having a multiplicity of perforations adapted to receive the tips of said end pieces and carry them out of the mass of pieces by the revolution of the drum, means for rotating the drum, and means within the drum for receiving the tip end pieces withdrawn from said mass of pieces.

3. A machine for separating tip end pieces from a mass of cut bean pods which have not previously been snipped comprising a drum having a multiplicity of perforations adapted to receive the tips of said end pieces and carry them out of the mass of pieces by the revolution of the drum, means for rotating the drum, and a trough held stationary within the drum and open at its top and adapted to receive the tip end pieces carried up by the drum as they fall by gravity from the upper part of said rotating drum.

4. A machine for separating tip end pieces from a mass of cut bean pods which have not previously been snipped comprising a drum having a multiplicity of perforations adapted to receive the tips of said end pieces and carry them out of the mass of pieces by the revolution of the drum, means for rotating the drum, a trough held stationary within the drum and open at its top and adapted to receive the tip end pieces carried up by the drum as they fall by gravity from the upper part of said rotating drum, and a brush engaging the upper surface of the drum above the trough to knock off said tip end pieces.

5. A machine for separating tip end pieces from a mass of cut bean pods which have not previousy been snipped, comprising a drum having the walls formed of wire mesh with openings of a size to receive the tip extensions only of said end pieces and thereby to carry the end pieces out of the mass of pieces by the revolution of the drum, means for rotating the drum, and means within the drum for receiving the tip end pieces as they are discharged from the rotating drum.

6. In combination with a cutter adapted to cut up unsnipped bean pods into a mass of intermediate and tip end pieces, a rotating drum having a multiplicity of perforations of a size to receive the tip extensions of said end pieces and thereby to carry the end pieces out of the mass of pieces by the rotation of the drum, and means for feeding said mass of pieces directly from the cutter into the drum.

7. In combination with a cutter adapted to cut up unsnipped bean pods into a mass of intermediate and tip end pieces, a rotating drum having a multiplicity of perforations of a size to receive the tip extensions of said end pieces and thereby to carry the end pieces out of the mass of pieces by the rotation of the drum, means for feeding said mass of pieces directly from the cutter into the drum, and a trough held stationary within the drum and open at its top to receive the tip end pieces carried up by the drum as they fall by gravity from the upper part thereof.

8. In combination with a cutter adapted to cut up unsnipped bean pods into a mass of intermediate and tip end pieces, a drum having walls with perforations of a size to receive the tip extensions only of said end pieces, a trough within the drum having a wall extending close to the side wall of the drum, a brush above the trough engaging the upper portion of the drum, and means to rotate the drum toward said side wall, and means for feeding said mass of pieces from the cutter into the drum.

9. A machine for separating tip end pieces from a mass of cut bean pods which have not been previously snipped, comprising a drum having the walls formed of wire mesh in peripheral sections, the openings of the mesh in said several sections progressively diminishing in size from openings in the first section adapted to receive tip end extensions of the largest size to openings in the last section adapted to receive tip end extensions of the smallest size only, means for rotating the drum, and means for feeding the mass of pieces into said drum.

10. A machine for separating tip end pieces from a mass of cut bean pods which have not been previously snipped, comprising a drum having perforations formed in the walls thereof of different sizes, the largest size perforations being adapted to receive the largest tip end extensions and the smallest perforations being adapted to receive the smallest tip end extensions only, means for rotating the drum, and means for feeding the mass of pieces into said drum.

In testimony whereof I hereunto affix my signature.

EDWARD J. VAUDREUIL.